J. DINEEN.
ATTACHMENT FOR FISHING RODS.
APPLICATION FILED APR. 19, 1911.
1,015,009.
Patented Jan. 16, 1912.
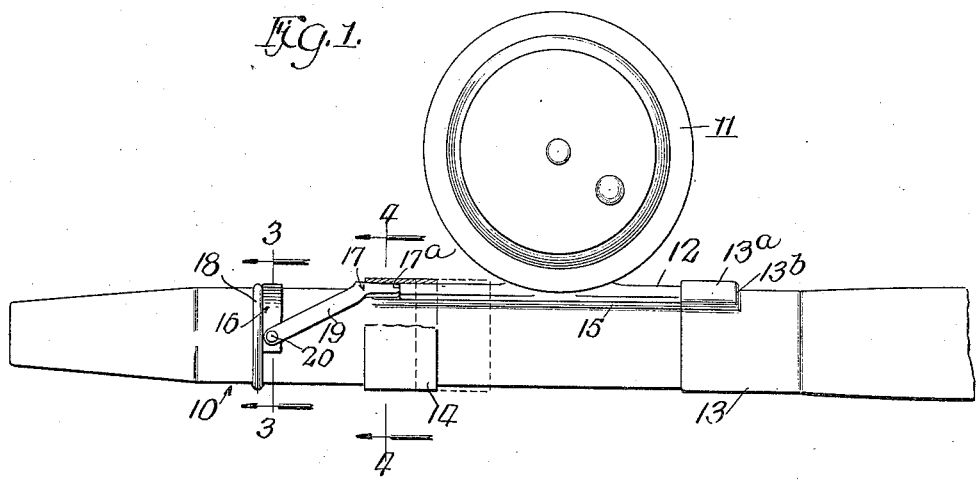
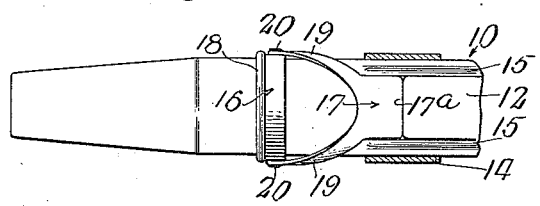
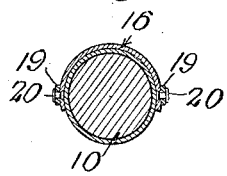
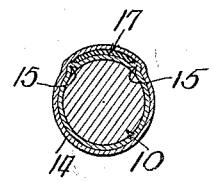
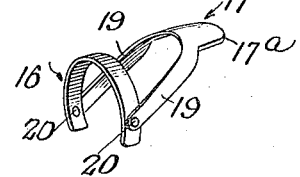
Witnesses:
T. H. Alfreds
J. R. Wilkins
Inventor:
John Dineen
by Poole & Brown Attys

UNITED STATES PATENT OFFICE.

JOHN DINEEN, OF CHICAGO, ILLINOIS.

ATTACHMENT FOR FISHING-RODS.

1,015,009.  Specification of Letters Patent.  Patented Jan. 16, 1912.

Application filed April 19, 1911. Serial No. 621,971.

*To all whom it may concern:*

Be it known that I, JOHN DINEEN, a citizen of the United States, and a resident of Chicago, in the county of Cook and State of Illinois, have invented certain new and useful Improvements in Attachments for Fishing-Rods; and I do hereby declare that the following is a full, clear, and exact description thereof, reference being had to the accompanying drawings, and to the letters of reference marked thereon, which form a part of this specification.

This invention relates to an improved attachment for fishing rods, and consists of the matters hereinafter described and more particularly pointed out in the appended claims.

The object of the improved attachment is to provide means for locking the reel on the rod so as to hold it securely in place and prevent it from working loose when using the rod.

In the drawings—Figure 1 is a view representing in side elevation a part of the handle section of the fishing rod, provided with my improved attachment, with the reel in place on the rod; Fig. 2 is a view representing a top plan view of part of the rod showing my improved attachment in place, with the forward movable ferrule, for holding the reel, shown in longitudinal section; Fig. 3 is a view representing a cross section through Fig. 1 on the line 3—3 thereof; Fig. 4 is a view representing a like section on the line 4—4 of Fig. 1; Fig. 5 is a perspective view of my improved attachment before it is applied to the rod.

Referring now to that embodiment of my invention, illustrated in the drawings, 10 indicates the handle section of a fishing rod, in this case a jointed rod, 11, a reel, 12, the reel-base, and 13, the fixed ferrule, and 14, the movable ferrule, by means of which the reel-base is secured to the rod in a familiar manner.

The rod shown herein, is a casting rod with the reel located on the top thereof, the handle section being provided with longitudinally extending ribs 15, which provide lateral supports for the sides of the transversely curved bar constituting the base 12 of the reel. The rear fixed ferrule 13 is provided with a socket 13ª to receive the rear end of the base 12 of the reel, said socket having a rear end wall 13ᵇ against which the rear end of said base abuts. The forward slidable ferrule 14 is adapted to be slipped over the forward end of the reel-base 12, when said reel base is in place, and thus lock the same to the rod.

The parts thus far described are of familiar construction and form no part of the present invention.

Notwithstanding that the forward ferrule 14 may be constructed so as to clamp the forward end of the reel-base against the rod, it is practically impossible, by this construction, to prevent the reel-base from creeping forward under the force of the frequent shocks or jars to which the reel is subjected in the ordinary use of the rod. This forward movement of the reel-base is by friction communicated to the forward movable ferrule which in time works loose so that the reel-base is no longer rigidly connected to the rod as it should be, and it not infrequently happens that the movable ferrule slips forward beyond the end of the reel-base, and the reel-base having in the meantime become disconnected from the fixed ferrule, the reel falls from the rod. My improved attachment is designed to lock the reel-base against longitudinal movement on the rod and also preferably to wedge the forward ferrule against sliding movement on the rod after it has been moved into its final position.

The attachment comprises a ring or rod member 16, by means of which it is secured to the rod and a locking member 17, which is connected to said ring member so as to be capable of a swinging movement toward and away from the rod. As shown in the drawings, said ring member includes an arc slightly greater than a semi-circle, and is adapted to embrace the rod 10. It is preferably located with its forward edge in engagement against an annular, rounded shoulder 18 on the handle section of the rod, which limits the telescoping movement of the next section of the rod with reference to the handle section of the rod when said two sections are connected together in the usual manner. Said ring is preferably rigidly secured to the rod in any convenient fashion, as for example, by soldering it upon the rod.

19, 19 indicate laterally separated arms in the form of extensions of the locking member 17. Said arms are pivotally connected at their forward ends to the ring 16, by means of pins 20, 20, the axes of said pivot pins being located in a horizontal diameter of the rod. The arms 19 are made of such length that when the reel-base is in position on the rod with its rear end pushed home in the socket 13$^a$ of the rear ferrule, the rear end 17$^a$ of said locking member will abut against the forward end of the reel-base. Said locking member 17 is curved transversely, and is preferably so constructed that when it is in the position with its rear end in engagement with the forward end of the reel-base and in contact with the rod, its upper surface will be inclined away from the rod in a forward direction.

The operation of the device is as follows: When the reel is to be applied to the rod, the locking member 17 is swung upwardly away from the rod upon the pivot pins 20 and the movable ferrule is moved forward beyond the longitudinal shoulders 15, 15 of the rod. The reel-base is then placed on the rod with its lateral edges against the longitudinal shoulders 15, 15, and is moved backward until its rear end is engaged within the socket 13$^a$ of the rear ferrule and against the rear wall 13$^b$ thereof. The forward ferrule 14 is then moved rearwardly into the position indicated by dotted lines in Fig. 1, so that its forward edge leaves the forward end of the reel-base uncovered. The locking member 17 of the attachment is then swung downwardly into engagement with the rod with its rear end 17$^a$ in abutting relation with the forward end of the reel-base. The movable ferrule 14 is then slipped forwardly over the locking member 17, as far as it will go, as shown in full lines in Fig. 1, said ferrule being then clamped in position by the inclined upper surface of the locking member. This locks the reel-base in place.

The advantages of my improvement are apparent from this description. Any longitudinal movement of the reel-base is absolutely prevented by reason of its engagement with the rear end of the locking member 17, and thus the initial loosening of the movable ferrule 14 is prevented. The ferrule, itself, is held in place by the wedge action of the locking member 17 and any tendency of the reel-base to move forward, by its frictional engagement with the under side of the ferrule, tends to push said ferrule forwardly and thus more rigidly wedge it in place. By locating the ring 16 in engaging relation with the annular shoulder 18, the thrust of the reel-base against the locking member 17 is partially taken up by said shoulder.

Manifestly the essential feature of my improved attachment is its locking engagement in abutting relation with the end of the reel-base whereby any movement or creeping of the reel-base on the rod is absolutely prevented. In addition the preferred embodiment of the invention shown herein provides a wedge to lock the movable ferrule against longitudinal movement but this latter feature is not essential.

While in describing one embodiment of my invention I have referred to certain details of mechanical construction, it is to be understood that my invention is not limited thereby except in so far as may be pointed out in the appended claims.

I claim as my invention—

1. An attachment for fishing rods for locking a reel-base to the rod comprising in combination with the rod, a fixed ferrule and a movable ferrule, each adapted for engagement with the ends of said reel-base, a locking member with an end having direct endwise abutting engagement with that end of the reel-base opposite the end engaged by said fixed ferrule, and means for connecting said locking member to the rod providing a swinging movement of said locking member toward and away from the rod.

2. An attachment for fishing rods for locking a reel-base to the rod comprising in combination with the rod, a fixed ferrule and a movable ferrule, each adapted for engagement with the ends of said reel-base, a locking member having an end adapted for abutting engagement with that end of the reel-base opposite the end engaged by the fixed ferrule, said locking member having an upper inclined surface adapted to engage as a wedge between the movable ferrule and the rod when said movable ferrule is moved in a direction to slide it off the reel-base, and means for connecting said locking member to the rod providing a swinging movement of said locking member toward and away from the rod.

3. An attachment for fishing rods for locking a reel-base to the rod comprising in combination with the rod, a fixed and movable ferrule, each adapted for engagement with the ends of said reel-base, a locking member having an end adapted for engagement with that end of the reel-base opposite the end engaged by the fixed ferrule, said locking member having an upper inclined surface adapted to engage as a wedge between the movable ferrule and the rod when said movable ferrule is moved in a direction to slide it off the reel-base, an arcuate member adapted to embrace the rod, and having rigid connection therewith, and arms made integral with said locking member and having pivotal connection with said arcuate member.

4. An attachment for fishing rods for locking a reel-base to the rod comprising an arcuate member adapted to embrace the rod, a locking member adapted to present a wedge surface when engaged with the rod, and arms integral with said locking member and pivotally connected at their ends to said arcuate member.

5. An attachment for fishing rods for locking a reel-base to the rod comprising a rod-member adapted to be secured to the rod, a locking member having direct endwise abutting engagement with one end of said reel-base, and means connecting said locking member in hinged relation with said rod member.

In testimony, that I claim the foregoing as my invention I affix my signature in the presence of two witnesses, this 14th day of April A. D. 1911.

JOHN DINEEN.

Witnesses:
CLARENCE E. MEHLHOPE,
GEORGE R. WILKINS.

Copies of this patent may be obtained for five cents each, by addressing the "Commissioner of Patents, Washington, D. C."